United States Patent
McDowall et al.

(10) Patent No.: US 6,441,815 B1
(45) Date of Patent: Aug. 27, 2002

(54) METHOD AND SYSTEM FOR HIGH PERFORMANCE COMPUTER-GENERATED VIRTUAL ENVIRONMENTS

(75) Inventors: Ian E. McDowall; Mark T. Bolas, both of Menlo Park, CA (US)

(73) Assignee: Fakespace Labs, Inc., Mountain View, CA (US)

( * ) Notice: Subject to any disclaimer, the term of this patent is extended or adjusted under 35 U.S.C. 154(b) by 0 days.

(21) Appl. No.: 09/945,405

(22) Filed: Aug. 31, 2001

Related U.S. Application Data

(63) Continuation of application No. 09/313,508, filed on May 17, 1999, now Pat. No. 6,285,370, which is a continuation of application No. 08/498,221, filed on Jul. 5, 1995, now Pat. No. 5,905,499.

(51) Int. Cl.[7] ............................................... G06T 15/00
(52) U.S. Cl. ...................................................... 345/419
(58) Field of Search .............................. 345/419, 420, 345/582, 589, 156, 157

(56) References Cited

U.S. PATENT DOCUMENTS

| | | | |
|---|---|---|---|
| 5,130,749 A | 7/1992 | Ritchey | 358/87 |
| 5,267,154 A | 11/1993 | Takeuchi et al. | 364/419.2 |
| 5,495,576 A | 2/1996 | Ritchey | 395/125 |
| 5,504,845 A * | 4/1996 | Vecchione | 395/119 |
| 5,513,129 A | 4/1996 | Bolas et al. | 364/578 |
| 5,696,892 A | 12/1997 | Redmann et al. | 345/425 |
| 5,905,499 A * | 5/1999 | McDowall et al. | 345/419 |
| 6,285,370 B1 * | 9/2001 | McDowall et al. | 345/419 |

* cited by examiner

Primary Examiner—Phu K. Nguyen
(74) Attorney, Agent, or Firm—K. David Crockett, Esq.; Crockett & Crockett

(57) ABSTRACT

A computer system and computer-implemented method for rendering images in real-time with a three-dimensional appearance. Using a database including at least one pair of texture maps uses as a stereo pair behind a portal to simulate a scene. An input database can be processed to generate a processed database by performing texture mapping to replace at least one portion of the input data representing a view (or object) by data indicative of a pair of texture maps and an associated polygon or polygons. One of the texture maps represents the view (object) from a left-eye viewpoint; the other represents the view (object) from a right-eye viewpoint. In some embodiments, to generate the texture map pairs, the input database analyzed to produce the images. In other embodiments the images are from photographs or other sources.

3 Claims, 4 Drawing Sheets

METHOD AND SYSTEM FOR HIGH PERFORMANCE COMPUTER-GENERATED VIRTUAL ENVIRONMENTS

This application is a continuation of U.S. application Ser. No. 09/313,508 filed May 17, 1999, now U.S. Pat. No. 6,285,370, which in turn is a continuation of U.S. application Ser. No. 08/498,221 filed Jul. 5, 1995, now U.S. Pat. No. 5,905,499.

FIELD OF THE INVENTIONS

The invention pertains to the field of computer graphics, particularly to methods for rendering complex scenes quickly and efficiently. In preferred embodiments, the invention pertains to methods and systems for real-time rendering of images, especially for creating computer-generated virtual environments or displayed virtual objects in virtual environments.

BACKGROUND OF THE INVENTIONS

The terms "virtual environment", "virtual world", and "virtual reality" are used interchangeably to describe a computer-simulated environment (intended to be immersive) which includes a graphic display (from a user's first person perspective, in a form intended to be immersive to the user), and optionally also sounds that simulate environmental sounds. The abbreviation "VR" will sometimes be used herein to denote "virtual reality", "virtual environment", or "virtual world". A computer system programmed with software, and including peripheral devices, for producing a virtual environment will sometimes be referred to herein as a VR system or VR processor.

In the computer graphics art (including the art of designing and operating computer systems for producing virtual environments), complex scene rendering is typically accomplished by methods which restrict what is rendered to that in the viewing frustum. A current focus of computer graphics research into the efficient rendering of 3D scenes pertains to development of methods for efficient culling of a relatively small subset of data, defining a 3D scene to be drawn, from a relatively large database.

There have been attempts to reduce the actual complexity of a displayed scene by creating in a database several versions of an item (to be displayed), with the different versions ("models") of each item having different levels of detail. During rendering of a scene to include a representation of the item, a determination is made as to which of the models should be used. The determination is made on the basis of some metric. Usually the metric is the distance between the viewer's eye and the item (object) in world space. Thus models for large values of the metric (far away distances) are more coarse (e.g., have lower accuracy and fewer vertices) than models for small values of the metric (near distances). This "level of detail" approach to scene rendering has been employed in flight simulation systems. In flight simulation the level of detail (LOD) method works well. The objects on the ground such as buildings and so on appear on the horizon and the airplane speeds towards them the models are switched out for higher resolution models. However, in other applications such as computer aided design (CAD) in which the database represents a large number of detailed objects, the "level of detail" approach does not produce significant benefits because the objects are too close to one another and the switching of the models may be noticed by the human eye. In these other applications, it would be much more useful to reduce polygonal complexity overall than to reduce complexity of a selected few displayed objects.

Efficient culling algorithms also speed up traditional computer graphics. They work by reducing the number of polygons which have to be drawn. A good example of this type of work is described in the literature see for example Teller, T. J. and Sé quin, C. H., *Visibility Processing For Interactive Walkthroughs*, Proceedings of SIGGRAPH '91 (Las Vegas, Nev., Jul. 28–Aug. 2, 1991) ACME SIGGRAPH, New York, 1991, pp. 61–70. This paper describes algorithms for the determination of the visibility cells from other cells in a building or other database with portals from one cell to another. The algorithm identifies these areas so that the rendering of the scene can ignore parts of the database which cannot be seen from the viewer's current viewpoint. This approach is most applicable to the interactive exploration of databases such as buildings, ships and other structures with explicit "openings" through which other parts of the database are visible.

Another technique for generating a database of image data for display is known as "texture mapping". This technique has been employed for various applications, and is described in the literature (see for example, J. D. Foley, *Computer Graphics: Principles and Practice*—2nd Ed., Addison-Wesley Publishing Company, pp. 741–744 (1990)). Computer systems have been developed for controlling the display of images resulting from texture mapping (for example, the "Reality Engine" developed by Silicon Graphics as described in R. S. Kalawsky, *The Science of Virtual Reality and Virtual Environments*, Addison-Wesley Publishing Company, pp. 168–178 (1993)). Texture mapping can be performed in real time by an appropriately designed hardware/software data processing system. Hardware texture mapping is available as a new feature on the latest generation of high performance graphics workstations and is becoming standard on graphics workstations.

Traditional implementations of texture mapping result in the apparent "shrink wrapping" (or "pasting") of a texture (image) onto a displayed representation of an object (virtual object), to increase the realism of the virtual object. The displayed texture modifies the surface color of the virtual object locally. The texture is traditionally created by photographing a real object and then scanning and digitizing the resulting photograph.

A texture map is defined by an array of data (texture elements or "texels") in texture coordinate space, which corresponds to an array of pixels on a geometric surface (in the coordinate space of the surface). The latter array of pixels can in turn correspond to a rectangular two-dimensional array of pixels for display on the flat screen of a display device. The texture coordinate space can be two-dimensional or three-dimensional. The geometric surface can be a polygon ("n-gon") or set of polygons.

For example, if texture mapping is employed to display a stop sign, the following image data can be stored for use in later generating the display: data determining a hexagon, and data determining the word "STOP" on a red background. Thus, texture mapping enables display of a stop sign with a relatively simple, inexpensive display control hardware/software system (having relatively small memory capacity), in contrast with a more complex and expensive system (with greater memory capacity) that would be needed to draw each letter of the sign as a collection of different colored polygons.

An example of texture mapping is described in Hirose, et al., "A Study on Synthetic Visual Sensation through Artificial Reality," 7th Symposium on Human Interface, Kyoto, Japan, pp. 675–682 (Oct. 23–25, 1991). Hirose, et al. send images of the real world from a camera to a computer system, which then texture maps the image data onto the inside of a virtual dome. Then, when a user wears a head-mounted display and looks around, he or she has the illusion of looking at the real world scene imaged by the camera. The Hirose system thus achieves a type of telepresence. The virtual dome is implemented as a set of polygons. Images from the camera are texture-mapped to the polygons. In this way a telepresence system is realized. From the user's point of view there is video from the camera all around. Thus, the polygonal dome is used to hold the images from the camera around the user. The dome is not attempting to model the space in any way.

In a virtual environment in which a different image is fed to each eye of the viewer, the application software generating the environment is said to be running in stereo. Viewers of such a virtual environment use the stereoscopic information in the images presented to their eyes to determine the relative placement of the displayed virtual objects. Hirose, et al. suggest (at p. 681) that their virtual dome should provide a "stereoscopic view" but do not discuss how to implement such a stereoscopic view. This system illustrates the potential power of texture mapping.

The Silicon Graphics Reality Engine (shown in FIG. 4.46 of the above-cited work by Kalawsky) has an architecture for displaying left and right images (for left and right eyes of a viewer, respectively) resulting from texture mapping. It is important to note however that the diagram illustrates only the hardware paths. From a software point of view there is an implicit assumption that the textures and other attributes of objects for the left and right eyes are the same. This assumption sneaks in because it is assumed that the scene graph is the same for both eyes. In general this is a valid assumption. In contrast with the general teachings of the prior art, the present invention pertains to specific, inventive applications of the concept of displaying stereoscopic images that are generated as a result of texture mapping in which one exploits the possibility of having different scene graphs or attributes depending on which eye is being drawn.

The method and apparatus of the present invention are particularly useful for creating virtual environments. For example, the invention is useful for implementing a VR system for creating virtual environments, of the type including an input device and user interface software which enable a user to interact with a scene being displayed, such as to simulate motion in the virtual environment or manipulation of displayed representations of objects in the virtual environment. The illusion of immersion in such a VR system is often strengthened by the use of head-tracking means or some other such system which directs the computer to generate images along the area of viewing interest of the user. A VR system which embodies the invention can rapidly and inexpensively create a wide variety of entertaining 3D virtual environments and 3D virtual objects.

SUMMARY

In a class of preferred embodiments, the invention is a computer system and computer-implemented method for rendering of images in real time with a three-dimensional (3D) appearance. The invention processes an input database or databases which contain portals and associated images which are stereo pairs. During the display of the resulting virtual environment, the images seen through the portals of the virtual environment will appear to contain depth. Stencil planes may be used to mask the textures from interfering with one another when the portals are in close proximity but "look" into different scenes.

In another class of embodiments, the invention employs a database including data determining a texture map pair and polygon for displaying a stereoscopic view (or views) on a displayed billboard as part of a larger image. A billboard is a virtual object which rotates in response to the viewer's direction of view so as always to remain oriented facing the user. Billboards are often used to simulate trees in virtual environments. One texture map represents the view from a left-eye viewpoint, and the other represents the view from a right-eye viewpoint. The database is then processed to display (simultaneously or substantially simultaneously) a left image (with "left" texture appearing on the billboard) for the viewer's left eye and a right image (with "right" texture appearing on the billboard) for the viewer's right eye.

In any embodiment of the invention, each texture map pair can be static or dynamic. A static texture map does not change with time. A dynamic texture map consists of a movie-like sequence of texture maps, which are sequentially displayed. This provides an additional element of realism to the displayed scene (or virtual environment) at the expense of texture memory.

In any embodiment of the invention, one texture map rendering may blend (e.g., cross fade) to another in response to movement of the viewer's viewpoint or some other parameter. For example, a view through a window may fade from summer to fall to winter over time or depending on where the viewer looks from.

Figure 1:
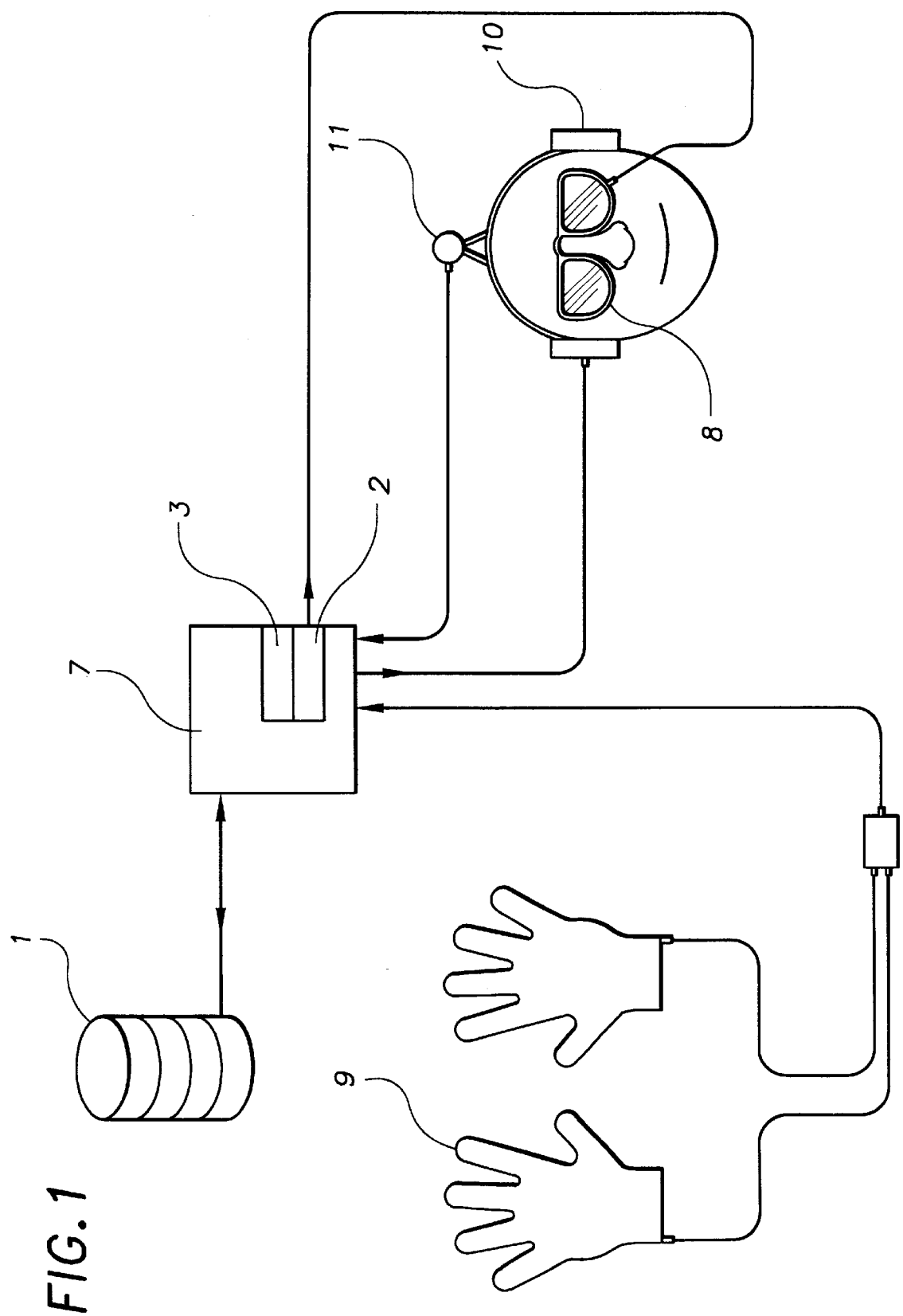
FIG. 1 is a diagram of a preferred embodiment of the inventive system, in which a VR processor receives, processes, and stores image data, and generates a stereoscopic virtual environment for display on a display device.

REFERENCE NUMERALS IN DRAWINGS 1 permanent database storage medium
3 on-line data storage for temporary storage of data
7 computer used to run the VR application
8 stereo display worn or used by the viewer or user
9 input device used to control the environment
10 head phones for stereo sound from the environment
11 head tracking device
201 walls of room
202 window open to the outside
203 open doorway to the outside
204 scene visible through window
205 scene visible through door
301 left eye texture
302 right eye texture 313 left view of near tree
314 left view of far tree
315 left view of mountains
323 right view of near tree
324 right view of far tree
325 right view of mountains
401 doorway
402 window frame
403 textured polygon for window
404 textured polygon for door
405 viewer
501 wall
502 portal
503 backdrop for stereo texture
601 doorway
602 window
603 near tree
604 far tree
606 walls
607 viewer
701 first position
702 second position
703 third position

DETAILED DESCRIPTION OF THE INVENTIONS

FIG. 1 is a diagram of a preferred embodiment of the inventive system. Data source 1 supplies an input database to VR processor 7. VR processor 7 is a computer programmed with software for implementing a virtual environment. Specifically, VR processor 7 controls the display (in stereo fashion) of data representing a virtual environment on stereoscopic display device 8 and controls the playback of left and right channels of audio signals (simulating sounds in the virtual environment) to a user wearing headphones 10 (which include left and right speakers). VR processor 7 is a computer which generally includes internal data storage 3, and a graphics sub system 2. The graphics sub system produces the images seen by the user through display 8 in real time.

Display device 8 can be any of a variety of devices, such as a device which mounts on the head of a human user (including left and right monitors for providing a stereoscopic display to the user), or a single flat screen display which outputs a field-sequential stereoscopic display.

Head-tracking means 11 is optionally provided for providing input (to processor 7) indicative of the position of the head of a human user wearing a head-mounted embodiment of display device 8. In each embodiment with head-tracking means 11, processor 7 is programmed to process position data received from head-tracking means 11, for use (for example) in controlling the view point of the displayed virtual environment.

Processor 7 is also programmed with software enabling a human user to interact with the virtual environment by manipulating input device 9, whose output is supplied to processor 7. In one embodiment, input device 9 includes a glove and sensors mounted to the glove for detecting movements of a user's hand within the glove. In another embodiment, input device 9 includes a frame and sensors for producing output signals indicative of forces or torques exerted on the frame by a user. The frame can be mounted to display device 8 (or to a base supporting the display device) symmetrically with respect to an axis of symmetry the display device, with limited freedom to move relative thereto, and the sensors are preferably mounted at the ends of the limited range of motion of the frame.

Figure 2:
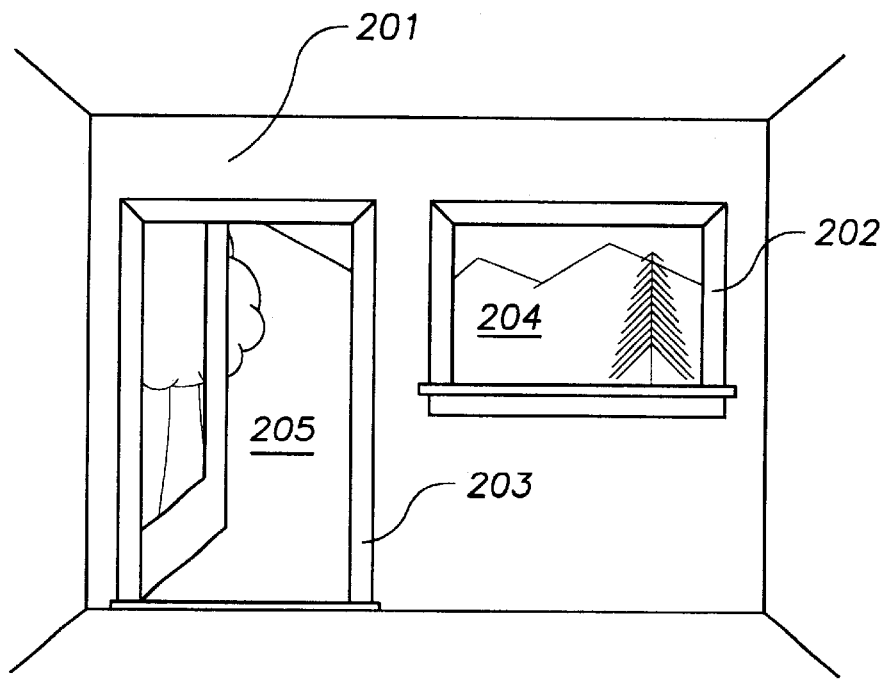
FIG. 2 is a diagram of a scene to be used as an illustrative example of the method disclosed.

In preferred embodiments to be described with reference to FIG. 2, the virtual environment consists of the interior of a room with views to the outside. At the far end wall 201 has a door 203 and window 202. These look out to scene 204 through the window and 205 through the door. In this and many other instances, a virtual environment simulates a "real" environment. The space being modeled in the virtual environment is the interior of a space—a room in which particular furnishings are to be evaluated for instance. The objects in the room are generally modeled using polygonal meshes and applied texture maps. The doors and windows (generally referred to here as portals) of the room may look out onto gardens or into other parts of the structure such as into another room.

Rather than creating a geometric model of the gardens or other objects outside the room one could simply take a photograph of a real garden and use it as a texture map in the place where the window should be. Thus where one would have had an opening looking out onto the garden one replaces this with a "picture on the wall" of the garden. This will not produce a very compelling illusion however. As we move in the room there will be no parallax between our viewpoint and the garden outside. The window will also look flat. All in all, the window will look more like what it really is, a picture of a garden rather than the illusion we are interested in creating of looking out of a window into another scene. This distinction is not possible to discern from a 2 dimensional image as in FIG. 2 which would look the same whether the garden is a flat photograph, or if the garden had been modeled in 3 dimensions to the finest detail.

In a virtual environment there are several additional visual cues not present when viewing flat artwork. The first such cue is stereo vision in which a viewer perceives an object to be closer than another object because the view of the scene from the two eyes of the viewer are used by the brain to estimate the distance to an object. The second cue which provides distance and relative depth information is motion parallax. As we move around, objects closer to us appear to move more than those in the background. If you move your head from side to side when looking out of a window a tree branch close to you will appear to move more than a building which is far away. Because of these additional motion and depth cues, using a flat picture of a garden in a virtual environment to simulate a window does not work as well as one might expect.

Figure 3:
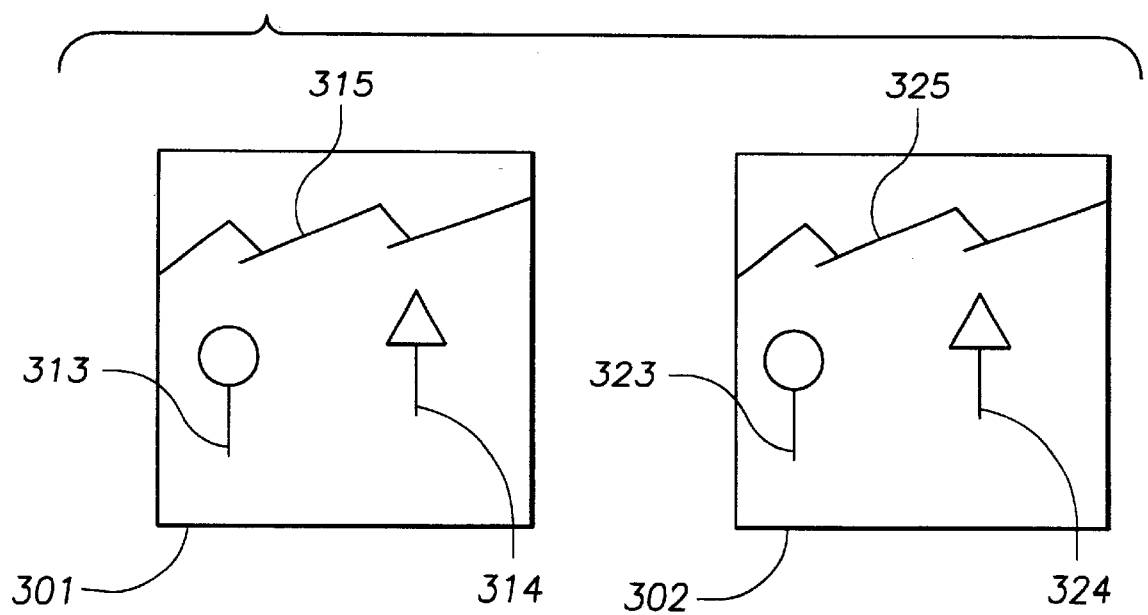
FIG. 3 is a view out over the garden of FIG. 2 from left and right eye viewpoints.
Figure 6:
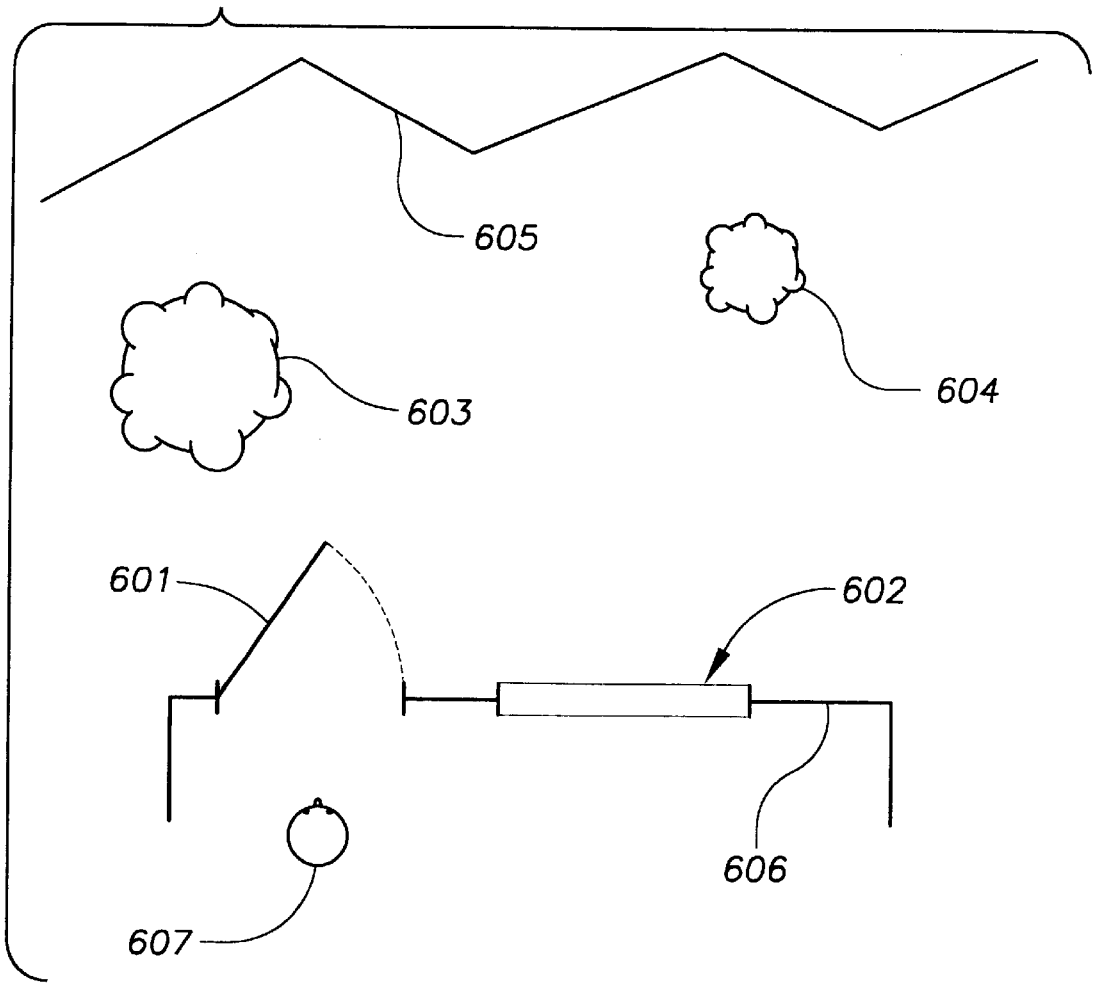
FIG. 6 is a top view of the scene from FIG. 1 as it would be without using the inventive method.

This inventive method creates the illusion we seek—the illusion of there being a garden beyond the window's frame without having to model every leaf and blade of grass. In FIG. 2 the desired illusion of there being a garden can be achieved if we take pictures of the garden which form stereo pairs of images. These images are then used in the virtual environment in a special way. We use the stereo pair of images as texture maps and apply them to a polygon (actually there are at least 2 polygons—one for the left eye and one for the right). The image drawn for the right eye of the viewer uses the right image from the stereo pair applied to a large polygon beyond the portal frame. The left eye sees the identical environment from its perspective and the left image from the stereo pair is applied to the polygon beyond the portal. Thus for each eye there is a texture mapped polygon larger than the opening located behind the portal. The textured polygons for the left and right eyes are shown in FIG. 3. 301 is the left eye view and 302 is the right eye view. In each scene, there are a number of objects. The trees 313 and 323 are physically the same tree but as seen from the two different positions. Tree 314 and 324 is further away than 313 and 323 and so it appears to move less relative to the mountains 315 and 325 which are essentially identical from the two perspectives. Note that the stereo effect is exaggerated somewhat so these features are obvious. FIG. 6 illustrates the "actual" scene as it would look if everything were actually drawn. The room is composed of walls 606, window 602 and door 601. Viewer 607 looks out onto tree 603 and tree 604. Mountains 605 have been shrunk to fit them on the paper. Note that in an accurate physical model the mountains would be as they are in real life—far away and very large, indeed the trees 603 and 604 would be just a spec if drawn in the correct scale relative to the mountains 605.

Figure 4:
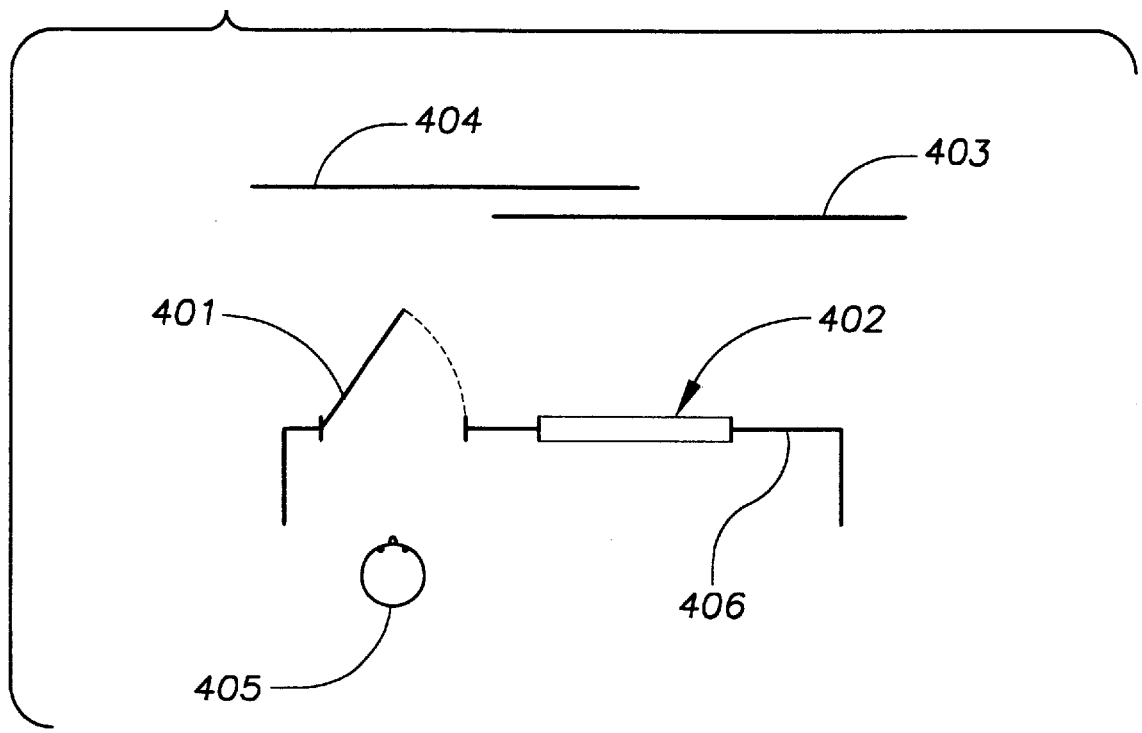
FIG. 4 is an illustration of the inventive method as implemented on the scene shown in FIG. 1.

The textures from FIG. 3 are used in FIG. 4. The images seen through door 203 of FIG. 2 and window 202 are created by texture mapping the left and right images onto the polygons behind the window and door. In FIG. 4 the door 401 in wall 406 looks out and sees polygon 404 which is texture mapped with images of the scene outside. Window 402 is open to the polygon 403 and associated left and right texture maps. A stereo pair of images is used as textures on the polygons which hang behind the window and the door. In this particular example there could be just one polygon and two texture maps, the door 401 and window 402 look out to the same scenery and thus one could use the same stereo pair. One achieves better stereo however by using a separate image for each. This is also more general. In particular, it is then possible to have the door and window look out on different scenes. This may not be desirable in an interior decoration application but could be a device used in an entertainment or gaming application where the scenes are not the same. Also note that while this example is phrased as looking out of a room into an expanse, this technique is also applicable to environments where the definition of the portals is less obvious and different. For instance if virtually traveling down a gangway in a ship, the chambers off the gangway could be replaced with textures. Portals may also be formed by obstructing pieces of geometry—an alleyway between two buildings might create a "portal" although the space is not explicitly defined in the database, a portal has been created. As shown in FIG. 4, the polygon with the image is located behind the frame of the portal from the viewer's point of view 405. This will produce motion parallax for the viewer. As the viewer moves to the right, the left hand edge of the window frame will expose more of the image hanging behind it. The stereo nature of the image also improves the feeling of looking out because the depth cues provided by stereopsis are generally present only in real scenes.

In some situations we may wish to have portals and images which could not actually exist. For instance we might have an open door and a window in a wall, the door might open out into what appears to be a garden and the window may look out onto a cityscape. By using stencil planes we can make sure that the texture for each portal (the window and the door) appears only through the intended opening. This does not occur naturally. Since we want the image behind the portal to be larger than the opening so the viewer sees parallax between the frame and the image, two adjacent openings looking at different scenes will not work correctly as the polygons behind the wall may overlap so one would see part of the wrong image. One method for rendering such a scene as intended can be accomplished by the following method:

1. Turn off updates to the Z buffer and color planes
2. Draw the door with the stencil plane value set to A
3. Draw the window with the stencil plan value set to B
4. Turn on updates to the Z buffer and color planes
5. Draw the texture mapped polygons to be seen through the door only where the stencil planes are equal to A
6. Draw the texture mapped polygons to be seen through the window only where the stencil planes are equal to B
7. Draw the rest of the scene Traditionally billboards have been used in visual simulation environments to simulate objects which look pretty much the same from all directions. Trees are a good example. To simulate a tree a single polygon and a texture map can be used. The polygon's normal will always face the viewer. By using a texture map on the polygon a pretty convincing tree can be simulated. In addition to the angle of the textured image to the viewer it is also possible to adjust the distance between the textured polygon and the portal.

By using a billboard as the way of displaying the stereo texture behind an opening one alleviates to some extent the problems related to being able to get close to the portal opening and peering around the edge of the texture. If using a billboard, the normal of the texture mapped image will be maintained parallel to the viewer. Thus as one peers around the corner, the texture image is rotated in unison and the textured polygon will intersect the wall in which the opening is located. If one does not use billboards to mount the textured images on then it is possible for a viewer to get close enough to the frame that the image can be seen completely and by going a little closer the edges will be seen.

Figure 5:
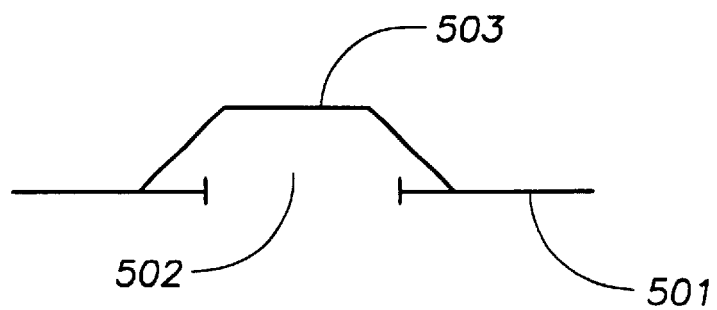
FIG. 5 is an illustration similar to that of FIG. 4 for a different embodiment in which the mounting surface for the images is not a single flat polygon.

Another approach to the peering problem is to make the mount for the image non flat. Instead of mounting the image on a single flat polygon behind an opening as shown in FIG. 3 it is possible to use a shaped surface like that of FIG. 5. This type of mount will make sure that a viewer gets the advantages of flat texture map but also helps mitigate some of the peering problems. One could also use a set of images on a section of a sphere or cylinder.

Figure 7:
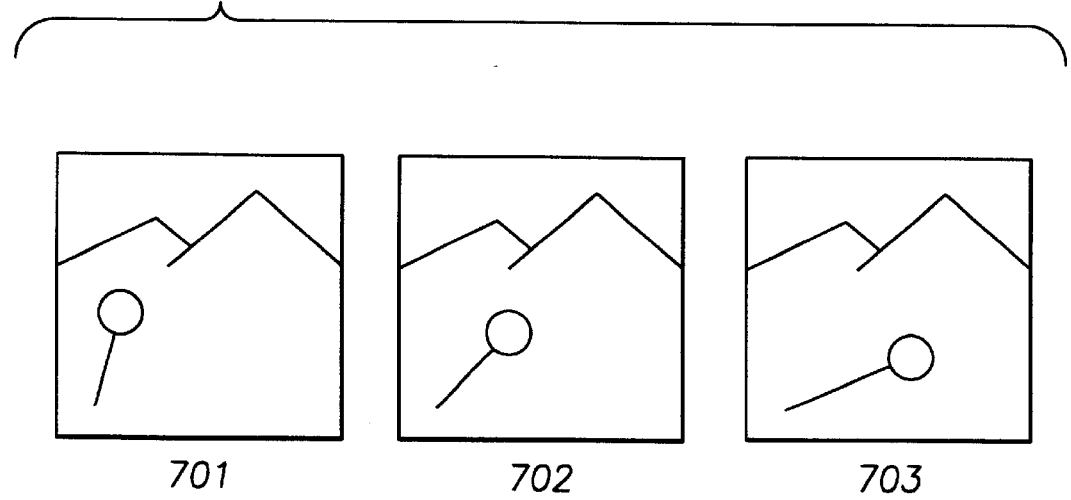
FIG. 7 illustrates a sequence of images which the inventive method can use to show motion in the textured scenes.

By replacing a texture with a series of textures, a dynamic environment can be simulated. The images of a garden through a window may be enhanced by including a sequence of stereo pairs which show a buffeting wind for instance. The motion in the scene of each object relative to its neighbors will make the scene appear more realistic and the virtual environment more compelling. This is illustrated in FIG. 7 which shows one of the viewpoints. In this sequence of 3 images the trees are blown by the wind. Repeated cycling of the texture mapped onto the polygon from 701 to 702 to 703 and then back 702 to 701 etc. would give the illusion of motion. The rate of transition from one image to the next can be varied over time so as to create a more realistic effect. The use of blending or fading between the textures as the transition from one texture to the next occurs will produce smoother motion.

Fading from one stereo texture pair to another can be used to perform a smooth transition. For instance if there are several sets of stereo pairs for a particular view through a window then as the viewer moves in the room then the view which best matches the viewer's current location can be used. As the viewer moves to a position where another pair would give a better illusion then as the viewer moves to it the images from both positions would be blended in the appropriate proportions. The proportion of the images is related to how close the viewer is to the ideal viewing location for that stereo pair. The fade is preferable to a sharp transition because sharp transitions are very noticeable to the viewer's eye. In fact, this would be a defect which a user could well be expected to notice and then bob one's head back and forth to see the changing images. By doing a smooth blend from one image pair to another, the eye does not catch any abrupt changes and thus will not notice the transitions as much thus maintaining a better illusion of the space behind the opening. Blended fades are simple to implement using a common technique called alpha blending. In addition to a simple cross fade using alpha blending, it is also possible to use a metamorphosis technique. Metamorphosis involves creating a transition or morph from one form or image to another in such a way as to have intermediate features at the intermediate steps. This will give a smoother segue from one image to the next but at the moment these techniques require intervention to define features in the various images to be tweened.

The images used as stereo pairs can come from a number of sources. They may be photographs, computer graphics images, live video, or some other source.

Photographs provide a method for getting the stereo pairs into the computer. A stereo pair of images are taken of a particular scene and then scanned into the computer and are used as the stereo pair. Images from old stereoscopes would work for instance. In addition to a single pair of images one may also use a set of positions so as to give higher quality results when looking from a number of positions in the virtual world by blending in the most appropriate image(s). A single image of a scene may be used to create a false stereo pair by editing the images carefully. At present this is done by hand but one could expect this to be computer done in the future. This retouching introduces the possibility of applying the stereo texture technique to the wide range of existing stock images. The advantage of using a stereo pair, as pointed out before, is that the images appear to be much more vivid and look more realistic in a virtual environment than simple flat two dimensional images.

One can also use computer databases to create the image pairs. In this case one may select part of a database either by applying a computer based heuristic or by hand. The images from the selected area of the database can be rendered using any rendering technique and stereo pairs generated. For instance if one were looking out over the garden of FIG. 2, the tree's and so on could have been computer generated and rendered (which is a slow process for a high quality photo realistic rendering). From the viewer's point of point of view, standing in the room the garden will appear to have been rendered at a very high quality (which it was) and at a quick frame rate (the image of the garden does not have to be recalculated every time the viewer moves). In fact, the textures may be updated every so often as the viewer is moving around in the room. Thus the garden can be rendered to appear at high quality but updated infrequently. In this way we maintain a fast and interactive environment while also preserving a high degree of fidelity in portions of the scene which are very costly to render such as plants which consume a large number of polygons in the complex curves and surfaces of which they are composed. This ability to mix the rendering of some parts of the scene in real time and other parts of the scene more periodically (as an "off line" process) lets the designer of a system trade some visual realism for faster overall frame rates.

In order to automatically decide which parts of a database to replace with a texture mapped stereo pair one may examine the database in a linear hierarchical fashion looking for areas of the database which contain a large number of vertices or other indications of expected rendering time. The linear hierarchical traversal will visit each node at each level in the database of the scene. Areas (or nodes) which are relatively dense are considered candidates for replacement with a stereo texture and associated polygons. That part of the database can then be rendered in order to grab the texture. Note that the drawing of the image to be used as a texture would, ideally, be rendered to a part of the frame buffer not visible to the user.

Once a database had had parts of it modeled using the stereo textures these may also be stored in the database along with or as a replacement for the geometry which the image pair were created to mimic. By maintaining both in one database it would be possible to switch from the real geometry to the textured model and vice versa. Thus if one walked out of the house in FIG. 4 into the garden, it could be transitioned from the texture based representation to the actual model.

Image pairs derived from computer based models (such as CAD models) can also be rendered in such a way as to retain information which lets one find out the source data for any part or texel in the textured images. There are many ways to do this. One way is to associate a tag field with each pixel as the images are drawn. They are stored as attribute bits for each object drawn. Once the rendering is finished, the color and tag information are stored as rectangular arrays of values. The generated images are then used as textures and the tag array is also kept as a lookup table. During the use of the texture pair it is then possible for the user to find out information as to the identity of any part of the texture mapped model by pointing to it and then looking up the associated tag back into the database. For instance, while drawing the images for a garden, a tag can be associated with each pixel in the image to identify the plant type in the original geometric model. When in use the user could point at the texture and the application could use the tag to identify the plant being pointed at. In addition to the user being able to identify items in the images by pointing the same identification facility is obviously available to the application also.

Various other modifications and alterations in the method and apparatus of the invention will be apparent to those skilled in the art without departing from the scope and spirit of this invention. Although the invention has been described in connection with specific preferred embodiments, it should be understood that the invention as claimed should not be unduly limited to such specific embodiments.

We claim:

1. A method for rendering a plurality of images on a display, said images comprising a plurality of pixels, with said images forming a three-dimensional appearance by using a processed database, and subsequently identifying said images with a color tag upon user request, said method including the steps of:

(a) supplying to a computer system, from the processed database, a selected pair of texture maps and associated polygons;

(b) operating the computer system to display a stereoscopic view in a region of a larger image, wherein the pair of texture maps and associated polygons determines the stereoscopic view and the region;

(c) operating the computer system to associate a tag field with each pixel as each of said images is drawn;

(d) storing the color tag and the tag field information as an array of values in a lookup database for later use as a lookup table;

(e) operating the computer system such that when a user points in a virtual space at one of said pair of texture maps and associated polygons with a data input device the computer system will retrieve, from the lookup database, the array of values associated with the pixels comprising the pair of texture maps and associated polygons; and (f) displaying information regarding an identity of a specified part of the pair of texture maps and associated polygons based on the array of values in the lookup database.

2. The method according to claim 1 where step (f) includes the further step of operating the computer system such that the color tag displays information identifying the pair of texture maps and associated polygons as a particular object.

3. A method for rendering a plurality of distinct images, each distinct image having a three-dimensional appearance and each distinct image rendered within one of a plurality of regions within a larger image, by using a processed database, said method including the steps of:

(a) supplying to a computer system, from the processed database, a selected pair of texture maps and associated polygons;

(b) operating the computer system to display a stereoscopic view in each of the plurality of regions of the larger image, wherein the pair of texture maps and associated polygons determines the stereoscopic view and the plurality of regions;

(c) operating the computer system to turn off updates to a Z buffer and to a plurality of color planes;

(d) operating the computer to draw a first image within the larger image with a stencil plane value set to a first parameter, drawing a second image within the larger image with a stencil plane value set to a second parameter, and continuing to draw images within the larger image with stencil plane values set to a particular parameter associated with a particular stencil plane value, until every image is drawn within the larger image;

(e) operating the computer to turn on the updates to the Z buffer and the color planes;

(f) operating the computer to draw a first set of texture mapped images and associated polygons to be seen through the first image only when the stencil planes are equal to the first parameter, to draw a second set of texture mapped images and associated polygons to be seen through the second image only when the stencil planes are equal to the second parameter, and continuing to draw only a particular set of texture mapped images and associated polygons within the larger image only when a stencil plane value is equal to the parameter associated with that stencil plane value;

(g) operating the computer to draw the larger image; and, (f) operating the computer to display the larger image and each of the very different images within the larger image as an entire scene.

* * * * *